United States Patent [19]

Gleitz et al.

[11] 3,990,040

[45] Nov. 2, 1976

[54] APPARATUS FOR TRANSMITTING DISTRESS SIGNALS

[75] Inventors: Jean-Jacques Gleitz; Jean-Raymond Narbaits-Jaureguy; Henri Billottet, all of Paris, France

[73] Assignee: Thomson-CSF, Paris, France

[22] Filed: Oct. 21, 1974

[21] Appl. No.: 516,574

[30] Foreign Application Priority Data
Oct. 23, 1973  France .............................. 73.37745

[52] U.S. Cl. .............................. 340/52 H; 340/61; 325/111
[51] Int. Cl.$^2$ ......................................... G08B 21/00
[58] Field of Search .............. 340/52 R, 52 F, 52 H, 340/53, 61, 262, 65; 325/111, 112, 114, 117

[56] References Cited
UNITED STATES PATENTS

| | | | |
|---|---|---|---|
| 2,473,050 | 6/1949 | Camp.................................. | 340/61 X |
| 3,102,982 | 9/1963 | Stypulkowski et al.............. | 325/112 |
| 3,251,033 | 5/1966 | Lawyer................................ | 340/61 |
| 3,461,423 | 8/1969 | Trumble ............................ | 340/61 X |
| 3,699,515 | 10/1972 | Barnett............................... | 340/65 |
| 3,840,088 | 10/1974 | Marumo et al. ................... | 340/52 H |

*Primary Examiner*—Alvin H. Waring
*Attorney, Agent, or Firm*—Karl F. Ross; Herbert Dubno

[57] ABSTRACT

A distress-signal generator aboard a vehicle includes a transmitter with a self-locking relay for energizing a high-frequency oscillator from a local battery in response to one or more trigger signals from respective detectors, specifically an impact detector and a deformation detector. The impact detector comprises two coacting members, one of them fixed to the vehicle body and the other freely movable with reference thereto, the elastically suspended mobile member being generally spool-shaped and having its waist received in an oblong opening of the plate-shaped fixed member. With the major axis of the oblong extending in the direction of vehicle motion, contact between the two members occurs in response to relatively small transverse and vertical accelerations but only with relatively large longitudinal acceleration; relative torsion is detected by a horizontal pin on the mobile member bracketed by two stops on the fixed member normally spaced therefrom. The deformation detector includes a bent wire with a rigid but rupturable sheath conforming to the shape of the vehicle body at critical locations. The transmitter comprises a multivibrator tuned to an audio frequency and energized in parallel with the oscillator by the relay, this multivibrator working through an RC circuit into the base of a transistor forming part of the oscillator so as to apply to it a sawtooth signal modulating the generated high-frequency oscillation in both amplitude and frequency, the modulated oscillation being sent out via an antenna coupled with the tank circuit of the oscillator.

7 Claims, 6 Drawing Figures

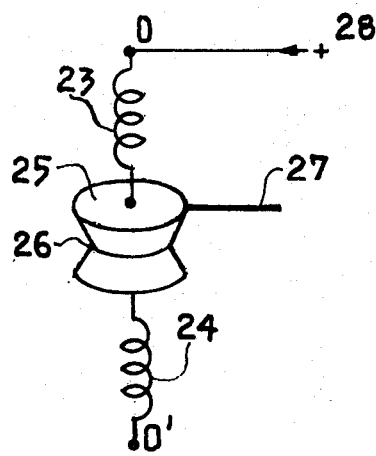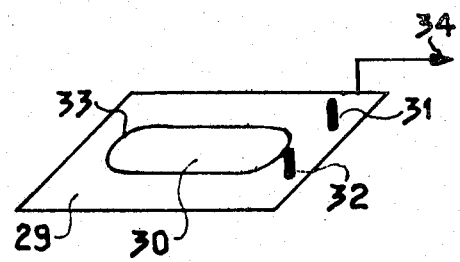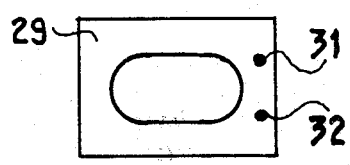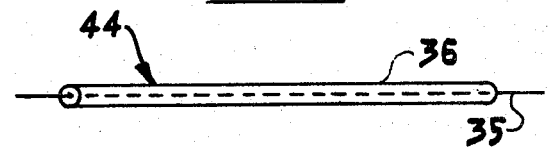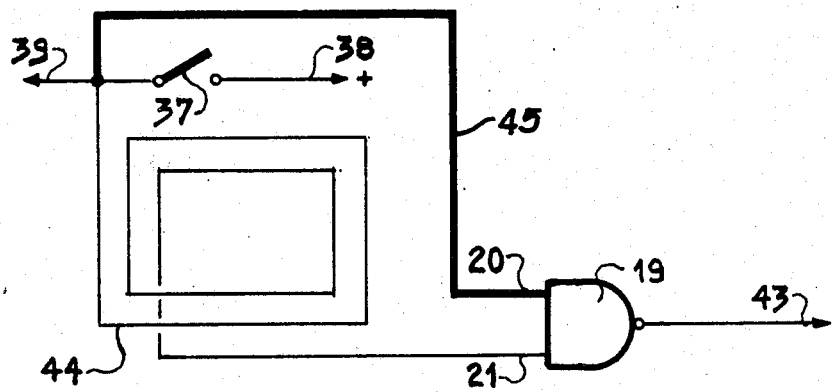

APPARATUS FOR TRANSMITTING DISTRESS SIGNALS

The present invention relates to automatic devices for transmitting distress signals, which are generally produced by special generators in response to a significant and therefore dangerous alternation in the behavior of the objects equipped with these devices.

A device of this kind finds a particular but nonlimitative application in fields relating to the safety of moving objects and in particular in connection with moving objects such as vehicles traveling along highways on which traffic conditions are increasingly difficult and dangerous and where accidents are becoming more and more frequent.

As here understood, a significant alteration in the behavior of a vehicle or the like should be understood as one which may affect the speed and/or the linear or angular acceleration or deceleration of the moving object as well as, inter alia, an alteration affecting its contour, i.e. in the shape of its body, due for example to crushing or tearing damage of the type which generally results from a violent impact with potentially serious consequences, particularly if time is allowed to pass and if help is slow in coming.

In the field of vehicular traffic, to which our invention primarily pertains, devices are known which automatically transmit signals, but these signals are not distress signals in the sense in which this term is understood and has been defined here. As an example, buoys are known which incorporate a transmitter emitting a signal to indicate the presence of a submarine which is unable to rise to the surface, the buoy being released automatically when the craft dives below a certain critical depth.

An object of our present invention is to provide an improved distress-signal generator with a transmitter adapted to respond to different trigger signals from a separate sensing circuit and to continue operating independently of that circuit upon having been activated.

Other objects of our invention are to provide improved impact and deformation detectors for activating the aforementioned transmitter in response to abnormal accelerations (or decelerations) and shape changes of the carrier of this signal generator.

A deformation detector according to our invention contacts the body of its carrier at a plurality of critical locations and preferably comprises an elongate rupturable conductor, substantially conforming to the shape of that body at these locations, formed by a frangible wire clad in a substantially rigid sheath of breakable material such as a cured thermosetting resin.

An impact detector according to our invention, particularly designed for a road vehicle, includes a fixed member secured to the vehicle body and a mobile member displaceable relatively thereto against a restraining force, one of these members — specifically the fixed one — having an oblong horizontal opening which receives the other member with clearance and whose major axis extends in the direction of vehicle motion whereby a substantially greater acceleration of the vehicle in the direction of motion is required than in a direction transverse thereto for establishing contact between the members at the edge of the opening, such contact resulting in the delivery of a trigger signal via suitable circuitry. Advantageously, the mobile member is generally spool-shaped with a vertical axis and with a waist in the plane of the plate-shaped fixed member, its upper and lower flanges respectively overlying and underlying the lateral edges of the plate opening so that the two members come into contact also in response to a sharp vertical acceleration. The mobile member may be elastically suspended, along its axis, by a pair of torsion springs resisting relative rotation of the two members, such rotation giving rise to a trigger signal upon engagement of a substantially horizontal projection of the mobile member with one of two stops normally spaced therefrom.

Pursuant to a further feature of our invention, the transmitter triggerable by the impact detector and/or the deformation detector comprises an oscillator tuned to a relatively high frequency, a multivibrator tuned to a relatively low frequency, and circuit means such as a self-locking relay for simultaneously activating the oscillator and the multivibrator in response to a trigger signal from the sensing circuit, the multivibrator having an output connected to a control input of the oscillator — specifically a transistor base — for modulating its high frequency with the period of the low multivibrator frequency. The connection between the multivibrator output and the control input of the oscillator advantageously includes a resistance/capacitance network for applying to that input a sawtooth signal which periodically varies both the amplitude and the frequency of the outgoing distress signal.

The invention will be best understood by reference to the following description taken in conjunction with the accompanying drawing in which:

FIGS. 2, 3 and 4 are various views of a device for generating the distress signals in accordance with our invention which senses an alteration in the acceleration of its carrier object; and FIGS. 5 and 6 are two views of another device according to the invention which generates distress signals in response to a violent impact.

Figure 1:
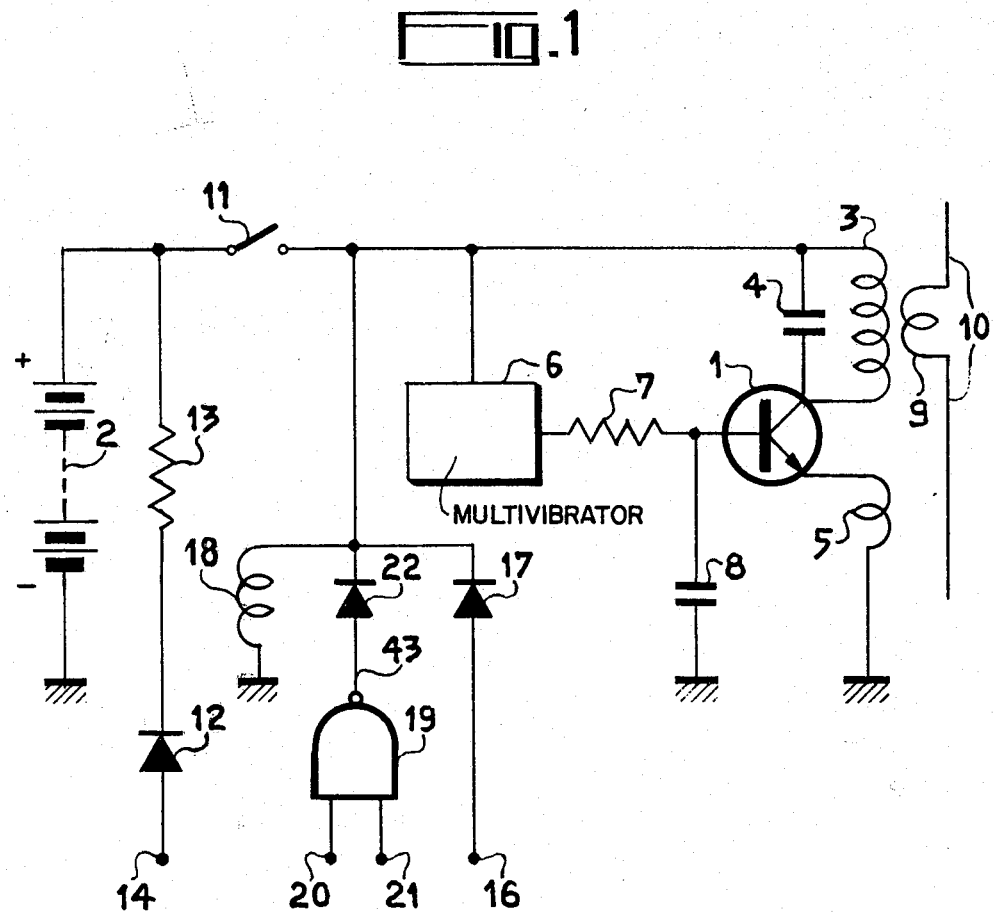
FIG. 1, is a diagram of a distress-signal transmitter according to the invention.

As stated above, the device for transmitting distress signals in accordance with our invention is generally arranged on a mobile carrier which may possibly suffer severe damage for various reasons, either because it is caused to move from its course in an abnormal way, or because it sustains an impact sufficiently severe to endanger it. In other words, the transmitted signals indicate that the object is in an abnormal situation and that it needs assistance. The signals thus transmitted are radio signals of a predetermined frequency which are picked up either by fixed stations or by mobile stations. The latter may be capable of receiving messages relating to, for example, traffic along predetermined main roads which are protected by a system whose effective area of radiation is limited.

The device according to the invention which is carried by a moving object does not form part of the system described above. It is self-contained and may even be ejectable so that it is not destroyed in the accident whose occurrence it indicates and it is so constructed that is continues to operate after being ejected if such is the case.

FIG. 1 shows a distress-signal transmitter comprising
An auto-oscillator which consists of a semiconductor power component 1, specifically an NPN transistor whose collector is connected to the positive terminal of a supply source 2 via an oscillating circuit consisting of an inductance 3 and a capacitor 4. The frequency of the oscillating circuit is advantageously the same as that of the protective, limited-radiation system mentioned above.

The emitter of the transistor 1 is connected to a feedback inductance 5 which enables the high-frequency oscillations of the oscillating circuit 3, 4 to be maintained. The base of component 1 is connected to a multivibrator circuit 6 which is tuned to an audio frequency, with the result that the transmitter sends out wave trains at the frequency of the multivibrator. The base of component 1 is connected to the output of multivibrator 6 via an RC circuit formed by a resistor 7 and a capacitor 8. Capacitor 8 has a double function. On the one hand it holds the base of semiconductor component 1 at a zero high-frequency potential so as to make oscillation possible and on the other hand it applies to the base of the transistor a sawtooth signal as the capacitor 8 is alternately charged and discharged through resistor 7. This biasing voltage is designed to vary the gain of the transistor and thus to change the radio frequency emitted during each wave train by the Miller effect. This being so, it will be possible for the distress signals emitted by the transmitter to be picked up both by amplitude-modulation receivers and by frequency-modulation or phase-modultation receivers. A winding 9 inductively couples the tank circuit 3, 4 to a transmission aerial 10 which may be a dipole.

The supply source 2 of this transmitter is formed by a battery whose positive pole is connected, via a contact 11 of a relay represented by its coil 18, to the oscillating circuit. This relay is used to put the transmitter into operation and responds to trigger signals produced in a way which will be described below. The supply source of the distress transmitter is also connected to a holding circuit which is formed by a diode 12 and a series resistor 13, the anode of the diode being connected at a point 14 to the battery of the vehicle carrying the transmitter. The role of diode 12 is to activate the components 1 and 6 and to protect the transmitter equipment against any short circuit which may occur upon a grounding of point 14 when an accident happens.

The transmitter is put into operation as a result of relay 18 being excited by trigger signals from any of several responding to an emergency condition either separately or simultaneously.

The moving object may become endangered by a sudden divergence from its course, following a skid for example, which causes a sharp deceleration. The latter may be sensed on board the moving object and its detection by the appropriate piece of equipment may result in a signal which is applied to an input 16 and, via the protective diode 17, excites the coil 18 of the relay which latter closes its contact 11 and energizes the auto-oscillating circuit 3, 4. Other triggering signals may be applied to inputs 20 and 21 of a NAND gate 19 whose output 43 is connected to coil 18 of the relay via a diode 22. Contact 11 also has a holding function since its closure keeps the coil 18 energized from terminal 14 and/or from the local battery 2 via parallel branch circuits.

In the above description the distress-signal transmitter has been assumed to be carried by a moving object. This moving object also carries a trigger-signal generator which causes the transmitter to put into operation. FIGS. 2, 3, and 4 show a sensor delivering such trigger signals in response to a substantial alteration in the acceleration of the moving object to input 16 of the transmitter shown in FIG. 1.

This device is capable of responding to any abnormal acceleration or deceleration which justifies a distress signal being transmitted. It comprises a conductive member 25 which is shaped like a grooved pulley or a spool having a waist 26. This pulley is held in a stable position by two elastic suspension elements, such as springs 23 and 24, which are fixed on the one hand to the pulley 25 at points located on its axis and on the other hand to two fixed points 0 and 0' respectively.

These springs exert opposing torques which tend to hold a substantially horizontal pin 27 in a precisely defined orientation. The pulley fits with its waist 26 into a horizontal plate 29 (FIGS. 3 and 4) which is provided with an opening 30 and also with two pins 31 and 32 bracketing the pin 27 and acting as stops therefor. The shape of the opening, like that of waist 26, depends on the acceleration thresholds to be detected. Generally speaking, the opening 30 is of elliptical configuration. When this is so, the minor axis of the ellipse is smaller than the diameter of the pulley 25 and larger than the diameter of the groove 26. The major axis of the ellipse extends in the direction in which the moving object travels. An insulating yoke which is not shown fixes the positions of points 0 and 0' in relation to the plate 29. This assembly is fastened to the body of the moving object. The pulley and the plate are mounted in such a way that the pin 27 attached to the pulley comes to lie between the pins 31, 32 on the plate.

Thus, in the case of a sudden longitudinal or lateral acceleration in the horizontal plane of the moving object, contact will be made between the pulley 25 along its groove 26 and the boundary of the opening 30. The pulley is made of metal and is connected to a source of potential 28. Plate 27 is likewise made of metal but may also be made of another material and in this case the periphery of opening 30 is metal-coated. The trigger signal which is generated appears at 34. Because of the oblong shape of opening 30, however, a much larger acceleration will be required in the direction of vehicle motion than in a transverse direction to produce a trigger signal. Contact will also be made in this way by the upper or the lower flange of member 25 in the event of sudden vertical acceleration. In the case of the vehicle turning about its vertical axis, the mobile member 25, because of its mass, tends to remain in its original position and exerts a torque couple on springs 23, 24. However, the member which is fixed with reference to the vehicle body, i.e. plate 29, turns in its horizontal plane and contact can be made in this way between one of the fixed pins 31, 32 and the moving pin 27.

To prevent any oscillatory action which might have an adverse effect on the operation of the assembly, the two springs 23, 24 are embedded in a substance of low viscosity which performs the function of a damper.

FIGS. 5 and 6 show another sensor 44, which is likewise carried by the moving object and which causes the distress-signal transmitter of FIG. 1 to be triggered in the case of abnormal situations affecting that object. These concern the condition of the vehicular body which in certain cases, in collisions for example, undergoes considerable deformation. It is such deformation which gives rise to the trigger and distress signals.

It is clear that the trigger signals from deformation detector 44 may act separately from, or simultaneously with, those set up by the detector of FIGS. 2 to 4. The deformation detector 44 is formed by a fine and therefore frangible conductive wire 35 which is contained in a breakable insulating sheath 36.

This assembly is positioned all along the body of the moving object and in particular along parts of the body whose deformation is likely to have more serious consequences. The insulator is formed by a thermosetting meterial. The emplaced cable is thus relatively pliable and is able to be adapted to the shape of the body. After installation, voltage is applied to the cable and the insulating sheath 36 is thermally set, thus giving it a certain rigidity as a result of which it can be broken by a sufficiently severe impact. The resulting rupture of the conductive wire 35 embedded in the sheath sets up a distress signal.

FIG. 6 shows schematically how the signal is applied to the transmitter proper in FIG. 1.

A very long conductor constituting the deformation detector 44, which follows the shape of the vehicle body and whose rupture at any point causes a trigger signal to be produced, is connected to the input 21 of NAND gate 19 whose output 43 is connected to diode 22 as described above. The other input 20 of gate 19 is connected to another, very strong, protected conductor 45. The two conductors are connected to a common start lead 39 which is connected to a battery lead 38 via a switch contact 37. The two conductors may be of substantially different lengths and the shorter conductor 45 may be provided with capactive and inductive compensation means to make allowance for the differences in the length of the paths which they follow and to prevent false alarms when contact 37 is closed. When the motor of the carrier vehicle is running, conductors 44 and 45 are energized and the output of the NAND gate 19 is at 0. If wire 44 should be broken, at any point whatever, the signal at input 21 goes to 0 whereas the signal at input 20 is still 1. The signal at output 43 of gate 19 goes to 1. There is thus generated signal which, via diode 22 of the transmitter, excites the coil 18 of the relay which triggers the transmitter into action.

There has thus been described a distress-signal transmitter which is triggered by signals corresponding to at least two major causes of accidents. The transmitter is advantageously made in the form of a self-contained and ejectable block which should continue to send out its distress signals even when separated from its support.

Of course, the invention is not limited to the embodiment described and shown which was given solely by way of example.

What is claimed is:

1. A distress-signal generator carried aboard a moving object, comprising:
   a deformation detector including an elongate rupturable conductor clad in a substantially rigid sheath of breakable insulating material, said conductor substantially conforming to the shape of the body of said object and contacting said body at a plurality of critical locations, and circuit means connected to said conductor for signaling any interruption thereof; and
   transmitting means connected to said circuit means for emitting a distress signal upon an interruption of said conductor;
   said circuit means including a lead protected against rupture and connected in parallel with said conductor to a source of operating voltage, and gate means with inputs respectively connected to said source via said conductor and said lead for generating an output signal triggering said transmitting means upon de-energization of one of said inputs by rupture of said conductor.

2. A distress-signal generator carried aboard a moving object, comprising:
   a deformation detector including an elongate rupturable conductor substantially conforming to the shape of the body of said object and contacting said body at a plurality of critical locations;
   a lead protected against rupture and connected in parallel with said conductor to a source of operating voltage;
   a NAND gate with inputs respectively connected to said lead and to said conductor, said NAND gate having an output delivering a trigger signals upon rupture of said conductor due to a significant shape change of said body at any of said critical locations; and
   transmitting means connected to said output for emitting a distress signal in response to said trigger signal.

3. A distress-signal generator as defined in claim 44 wherein said conductor comprises a frangible wire clad in a substantially rigid sheath of breakable material.

4. A distress-signal generator as defined in claim 21 wherein said breakable material is a cured thermosetting resin.

5. A distress-signal generator carried aboard a surface vehicle, comprising:
   sensing means for producing a trigger signal in response to an abnormal condition of said vehicle, said sensing means including an impact detector with a fixed member secured to the vehicle body and a mobile member displaceable relatively thereto against a restraining force, one of said members having an oblong horizontal opening receiving the other of said members with clearance, the major axis of said opening extending in the direction of vehicle motion whereby a substantially greater acceleration of the vehicle in said direction of motion is required than in a direction transverse thereto for establishing contact between said members at the edge of said opening, said members being provided with circuitry for delivering said trigger signal upon the establishment of said contact; and
   transmitting means connected to said sensing means for emitting a distress signal in response to said trigger signal;
   said fixed member being a horizontal plate provided with said opening, said mobile member being generally spool-shaped with a vertical axis and with a waist in the plane of said plate, and mobile member being provided with elastic suspension means engaging same along said vertical axis and providing said restraining force, said mobile member having upper and lower flanges respectively overlying and underlying the lateral edges of said opening for contacting said plate in response to a sharp vertical acceleration.

6. A distress-signal generator as defined in claim 25 wherein said elastic suspension means comprises a pair of torsion springs resisting relative rotation of said mobile member and said plate, said mobile member being provided with a substantially horizontal projection, said plate being provided by a pair of stops normally spaced from said projection and engageable thereby upon relative rotation of said members in a respective direction for producing said trigger signals upon such engagement.

7. A distress-signal generator as defined in claim 5 wherein said sensing means further includes a deformation detector contacting the vehicle body at a plurality of critical locations, said transmitting means comprising a relay energizable by a trigger signal from either of said detectors and provided with holding means for maintaining itself energized.

* * * * *